United States Patent

[11] 3,627,355

| [72] | Inventor | Robert R. Reddy<br>1195 Michillinda Blvd., Pasadena, Calif. 91107 |
|---|---|---|
| [21] | Appl. No. | 827,404 |
| [22] | Filed | May 23, 1969 |
| [45] | Patented | Dec. 14, 1971 |

[54] FLUIDTIGHT SWIVEL JOINT
1 Claim, 4 Drawing Figs.

[52] U.S. Cl. .................................................. 285/110, 285/190, 285/328
[51] Int. Cl. .................................................. F16l 17/00
[50] Field of Search .................................................. 285/110, 190 M, 190 S, 328

[56] References Cited
UNITED STATES PATENTS
| 3,098,662 | 7/1963 | Eversen | 285/110 X |
| 3,284,112 | 11/1966 | Martin | 285/328 |

FOREIGN PATENTS
| 1,092,555 | 11/1954 | France | 285/190 |
| 9,010 | 1910 | Great Britain | 285/190 |

*Primary Examiner*—Dave W. Arola
*Attorney*—Angus and Mon

ABSTRACT: A fluidtight sealing joint having a rotatable rotor mounted in a bore in a body, the bore being tapped by a port and the rotor having an internal passage communicating with said port. The rotor includes a pair of cylindrical portions on opposite sides of the port. Adjacent to each of these cylindrical portions is a lip seal having a mounting flange secured to the body, and a sealing lip bearing against the respective cylindrical portions. The sealing lips taper toward the cylindrical portion as they extend axially toward the port so as to form continuous seals symmetrical around the central axis of the bore and of the rotor so as to make a fluid seal at all rotational positions of the rotor.

PATENTED DEC 14 1971 3,627,355

INVENTOR.
ROBERT R. REDDY
BY
ATTORNEYS.

FLUIDTIGHT SWIVEL JOINT

This invention relates to a fluidtight swivel joint.

There is an established and longstanding need for a swivel joint which is easily serviced, simple in construction, and fluidtight even to the extent of holding helium at cryogenic temperatures. This invention provides such a device.

A swivel joint according to the invention includes a body having a bore with a central axis and a port connecting the outside of the body to the bore at a location intermediate of the ends of the bore. A rotor is rotatably mounted within the bore, its axis of rotation being coincident with the central axis. The rotor includes an internal passage which opens onto the port and a pair of cylindrical portions on its outer wall on opposite sides of the port. Adjacent to each of the cylindrical portions is a lip seal, each lip seal including a mounting flange held to the body, and a sealing lip which tapers toward the respective cylindrical portion as it extends axially toward the port. There is thereby made a dragging, continuously peripheral contact between the sealing lip and the cylindrical portion which will seal between the rotor and the body at any rotational position of the rotor.

Figure 1:
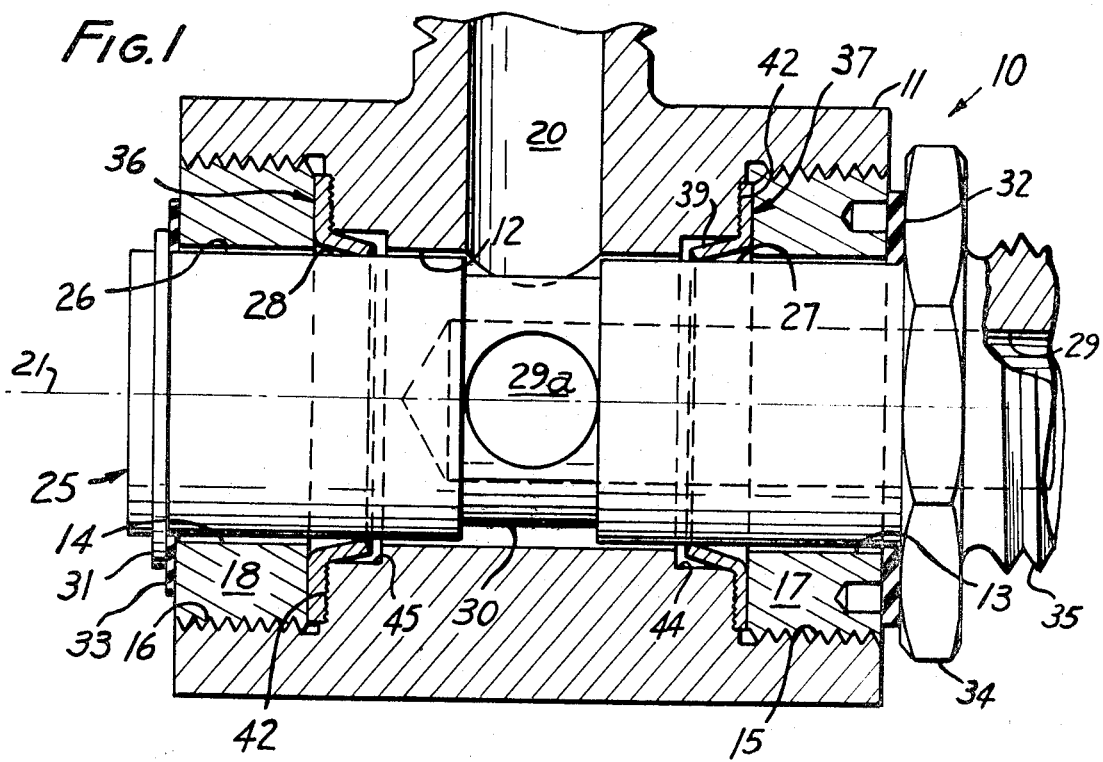
Figure 3:
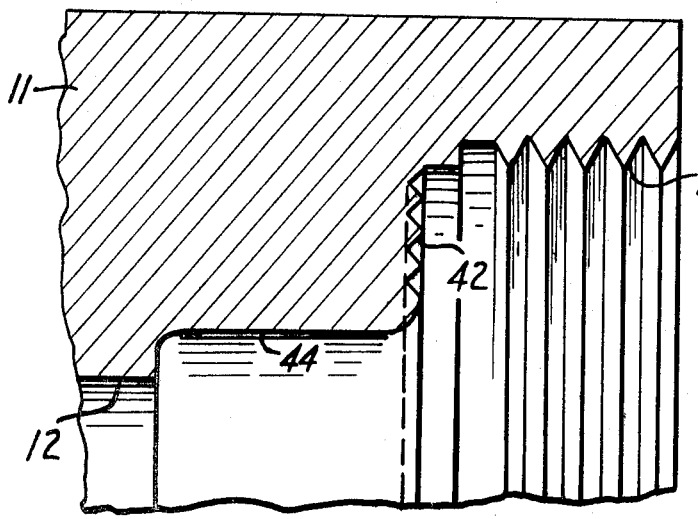
Figure 2:
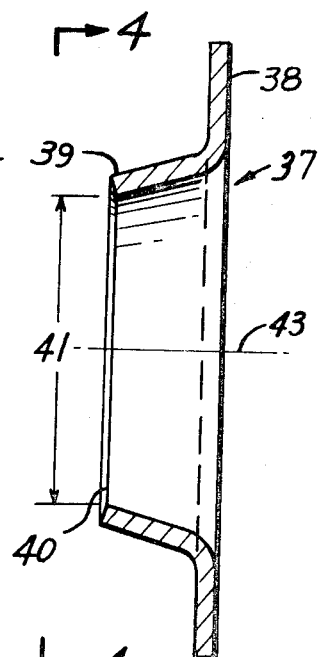
Figure 4:
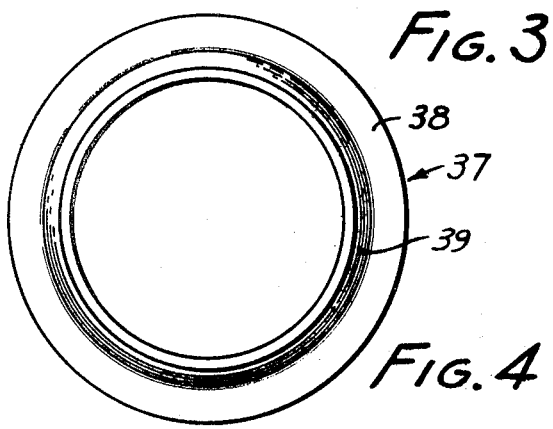

The invention will be fully understood from the following detailed description and the accompanying drawings, in which:

FIG. 1 is a side elevation partly in cutaway cross section of the presently preferred embodiment of the invention; and FIGS. 2, 3, and 4 are detailed drawings of portions of the device of FIG. 1.

FIG. 1 shows a swivel joint 10 according to the invention which includes a body 11 with a bore 12 extending therethrough. The bore has a first and a second end 13, 14, respectively. Each of these ends is counterbored so as to provide an internal thread 15, 16, respectively, within which retainer plugs 17, 18 are respectively threaded.

A port 20 side taps the body and communicates with the central bore 12 at a point intermediate between its ends. The bore has a central axis 21.

A rotor 25 is mounted in the bore for rotation therein, its axis of rotation being coincident with central axis 21. The rotor has an outer wall 26 with first and second cylindrical portions 27, 28 respectively. These are on opposite sides of port 20. It also has an internal passage 29 which may conveniently extend from one end of the rotor to a medial portion where it opens into fluid communication with port 20 through holes 29a which have an area greater than port 20 to prevent restriction of fluid flow. A recessed groove 30 may be provided to aid in the fluid communication, if desired, groove 30 having an area equal to or greater than port 20 to further prevent flow restriction, thereby making the angular position of where the passage opens onto the outer wall immaterial.

A retainer flange 31, which may be a snap ring seated in a groove may, if desired, be provided at the second end of the rotor to hold it against removal. Fluorelastomer thrust washers 32 and 33 may be installed adjacent to retainer plugs 17 and 18 to react unbalanced line pressure forces. The first end has a common hexagonal flange 34 to aid in assembling a next assembly to the rotor by means of threads 35. It will be seen that the axial position of the rotor within the body has a substantial extent and is not critical. In the embodiment shown passage 29 does not extend all the way through the bore. If three-way communication were desired, it could be continued through the second end of the rotor.

Sealing between the rotor and the body is made by a pair of lip seals 36, 37. Such a seal is shown in its relaxed condition in FIG. 2, there being a mounting flange 38 and a sealing lip 39. The sealing lip is frustoconical, and has a circular opening 40 whose diameter 41 in the relaxed condition is smaller than the diameter of the respective cylindrical portion against which it is to bear so that there will be a deflection and enlargement of the lip by the rotor, thereby aiding in the sealing action. This seal may conveniently be formed of material with a flexibility over a wide temperature range, the commonly known Kel-F or Teflon being common and convenient examples.

For improved sealing and for a firmer grip, circumferential grooves 42, preferably of V-shaped section, are formed in the body which indent themselves into the mounting flanges of the lip seals. This provides a fluid-sealing labyrinth, with some compression and displacement (indentation) of the sealing material so as to make a tight fluid seal with an undulating face between the body and the retainer plug. This indentation should occur to such an extent that it still exists when the seals and swivel materials shrink at cryogenic temperatures and is not disengaged or distorted due to various materials' expansion at higher temperatures.

The remaining necessary seal is made by the dragging fit of the sealing lips against the cylindrical portions of the rotor, it being noted that the axis 43 of the lip seal is coincident with the central axis of the bore and also with the axis of the respective cylindrical portion. The amount of difference between the diameters of openings 41 and of the cylindrical portions should permit an interference fit at the lowest expected temperatures. Reliefs 44 and 45 in the body will accommodate the deflected sealing lips.

Numerous modifications of this device may readily be conceived. The important features of it are the deflection of the sealing lips so as to form continuous peripheral seals which are coaxial with the central axis of the respective cylindrical portions. There is substantial freedom in axial motion, and the rotor itself may even be somewhat wobbly in the body.

This device is simple in construction and readily manufactured and it is surprising to note that with the retainer plugs only fingertight and with substantial clearances on the order of several thousandths of an inch on the radius between the rotor and the body, the device is fluidtight to helium and this extends over a wide temperature range such as from −400° F. to +300° F. The range is limited only by the seal material, and the device will be fluidtight at low temperatures so long as resilience remains, and at high temperatures so long as the material is not degraded.

I claim:

1. A fluidtight swivel joint comprising a body having a bore with a central axis passing entirely therethrough, and a port intersecting the bore at a location intermediate its ends and opening onto the outside of the body; a rotor rotatably mounted in said bore and extending entirely therethrough and having an axis of rotation coincident with said central axis; an outer wall on said rotor which includes a pair of axially spaced-apart cylindrical portions whose axes are coincident with the central axis and which are disposed on axially opposite sides of the port, the rotor further including a passage extending axially therein and opening onto the outer wall of the rotor in fluid communication with the port; a pair of lip seals, each being a body of revolution and having a substantially disclike mounting flange and a frustoconical sealing lip with a central opening which, when relaxed, is smaller than the said cylindrical portions so as to make a deflected interference sealing fit therewith; a set of circumferential grooves in a face on each end of the body against which the mounting flanges bear; a retainer for each seal mounted to the body and pressing the mounting flange against said grooves so as to deform the mounting flange and form a seal with an undulating face, the lip seals being made of a material selected from the group consisting of polytrifluorochloroethylene and tetrafluoroethylene; and thrust bearing means disposed between the rotor and the body to react any unbalanced forces derived from pressure in the swivel joint.

* * * * *